United States Patent [19]
Polos

[11] 3,874,264
[45] Apr. 1, 1975

[54] ANCHOR BOLT ASSEMBLY
[76] Inventor: Constantine D. Polos, 1955 Cheshire Ln., Lombard, Ill. 60187
[22] Filed: Feb. 16, 1973
[21] Appl. No.: 333,159

[52] U.S. Cl. .................................. 85/84, 85/80
[51] Int. Cl. .................................. F16b 13/06
[58] Field of Search ............ 85/84, 83, 82, 67, 80; 151/31; 248/71

[56]  References Cited
UNITED STATES PATENTS

| | | | |
|---|---|---|---|
| 2,386,922 | 10/1945 | Andrews et al. | 85/80 |
| 3,042,094 | 7/1962 | Liljeberg | 85/67 X |
| 3,143,917 | 8/1964 | Conner | 85/83 |

FOREIGN PATENTS OR APPLICATIONS

| | | | |
|---|---|---|---|
| 346,785 | 7/1960 | Switzerland | 85/84 |
| 2,055,875 | 5/1971 | Germany | 85/84 |
| 654,006 | 12/1962 | Canada | 85/67 |

Primary Examiner—Ramon S. Britts
Attorney, Agent, or Firm—Merriam, Marshall, Shapiro & Klose

[57]  ABSTRACT

Anchor plug assembly comprises a tubular expansible plug body having a portion which is deformed by compression when inserted into a hole, thereby holding the plug in the desired position. Completion of the assembly is made by engaging a bolt having expansion means thereon with the plug, expanding the plug into a set condition.

11 Claims, 10 Drawing Figures

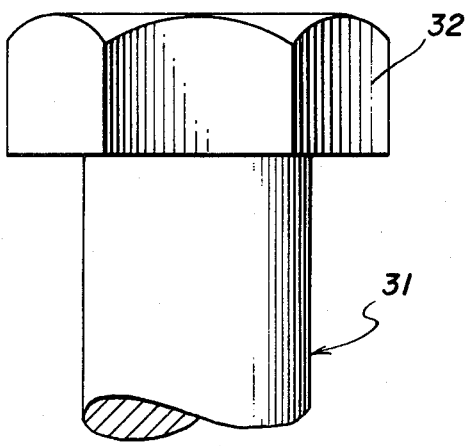
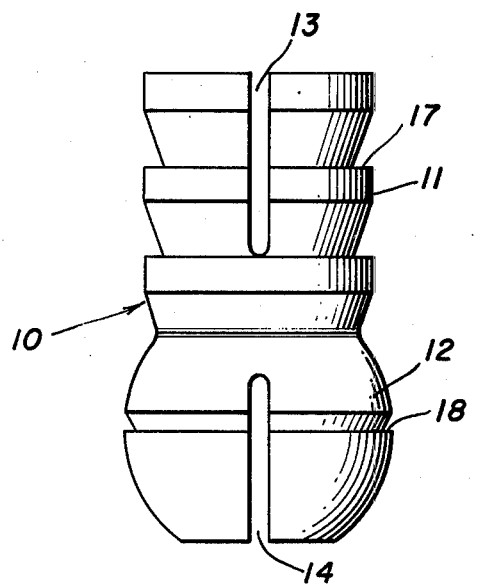
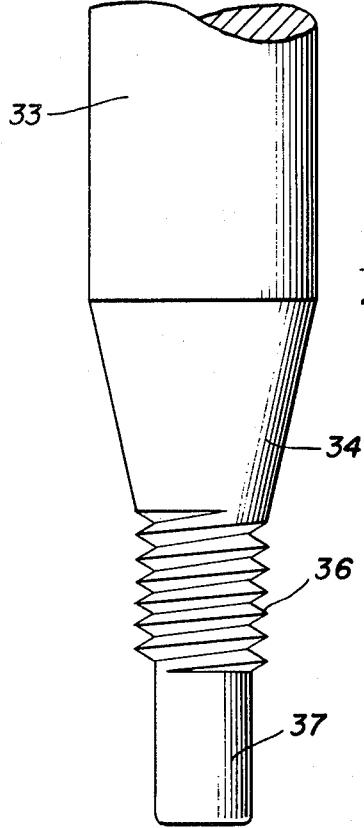
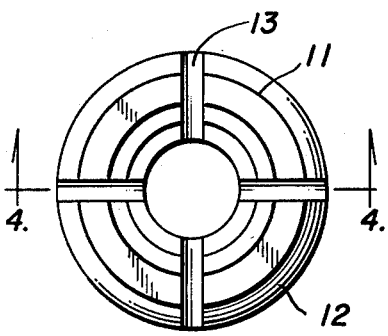
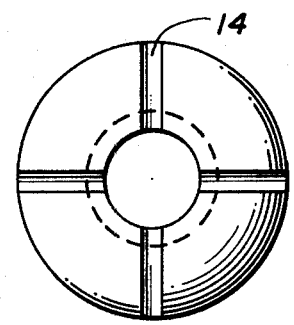
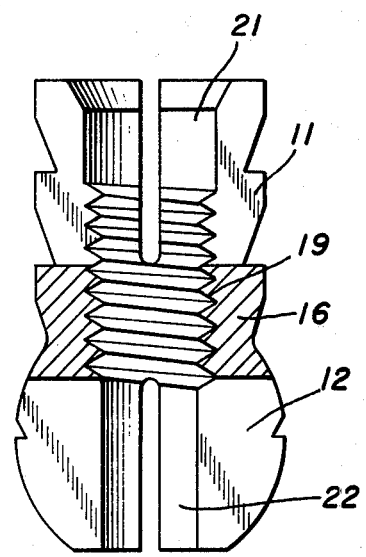

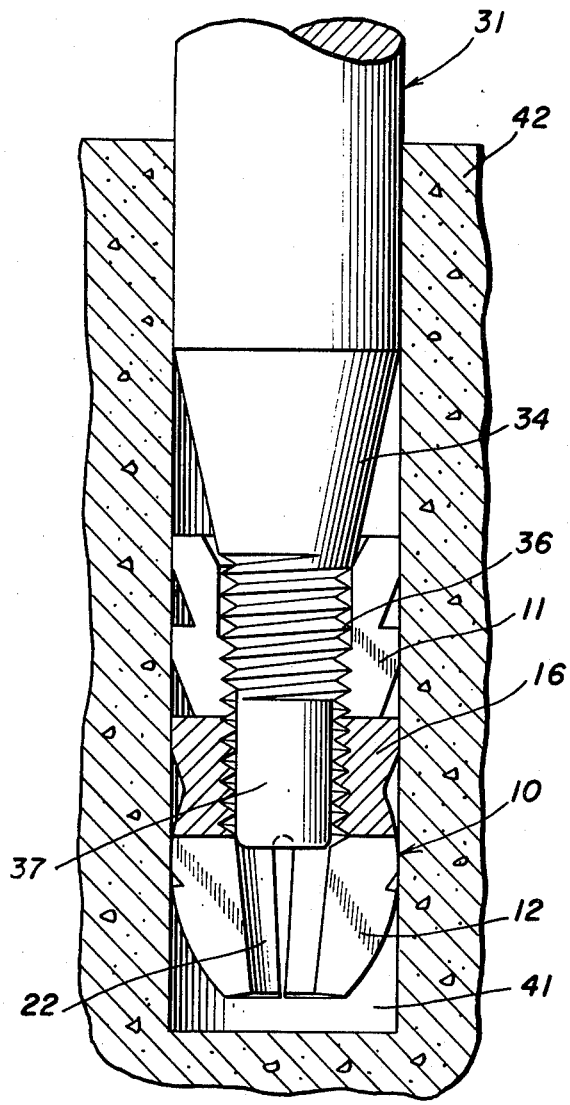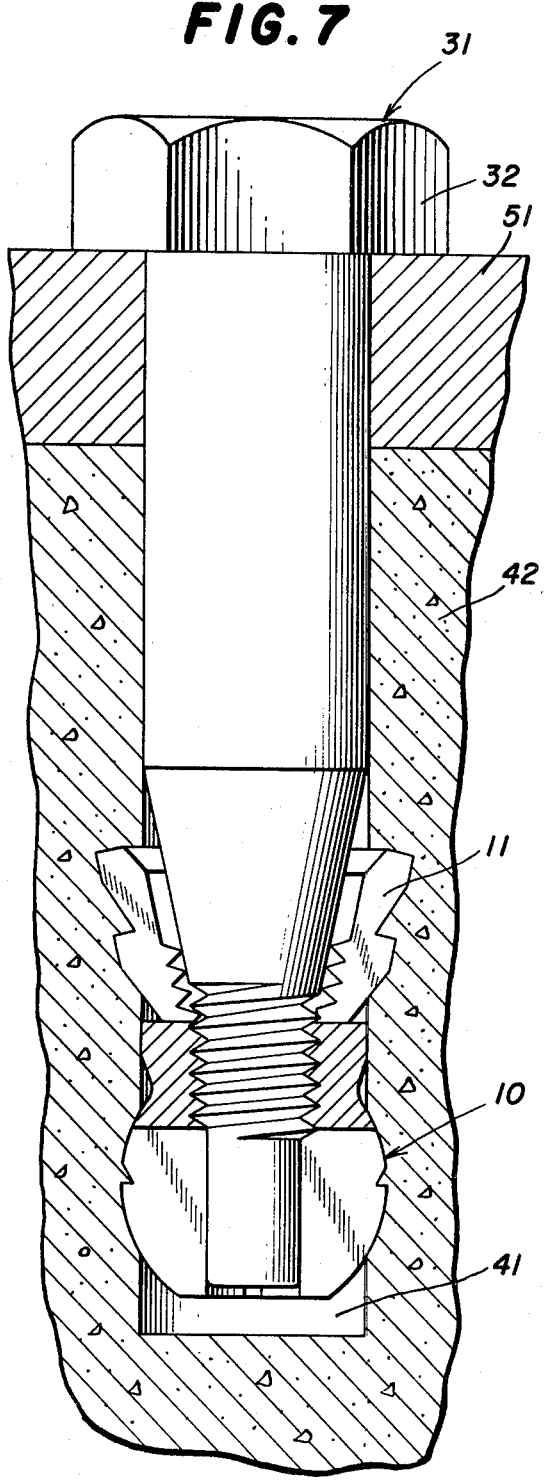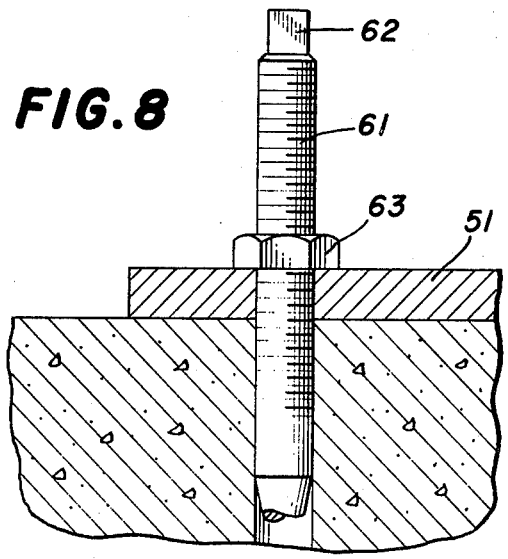

ANCHOR BOLT ASSEMBLY

This invention relates to mechanical fasteners of the anchor type and more particularly to a novel expansible anchor plug which can be used with a variety of bolts to provide assemblies suitable for making attachments to hard surfaces such as concrete floors, walls and ceilings.

A common problem encountered in industry involving the use of fastening devices is the anchoring of heavy machinery to concrete floors. The usual solution to this problem involves marking the position of the holes in the base of the machinery on the floor, moving the machinery from its position, drilling oversize holes in the concrete at the indicated hole positions, inserting into the holes fasteners of the anchor type, replacing the machinery in the original location, and completing the attachment by securing the anchor devices. In addition to the obvious complexity of this procedure involving the movement of the machinery several times, there is also the possibility that the anchor devices are not properly spotted or move during installation, so that the machinery can not be replaced in the desired location without relocating the anchor devices. This problem is solved by the anchor plug assembly of the invention, which permits anchoring machinery as it sits in its desired resting place with anchors that are inserted into holes in the floor which are drilled through the base holes of the machinery, thus assuring perfect placement of the anchor devices, without the necessity for moving the machinery at all.

Briefly described, the anchor plug of the assembly comprises a tubular body having a cylindrical portion and a bulb-shaped portion with a diameter slightly larger than that of the cylindrical portion. Both the cylindrical portion and the bulb portion are longitudinally slotted to permit radial expansion and contraction by a bolt inserted into the threaded bore of the cylindrical body. In use, the anchor plug is inserted into a predrilled hole having a diameter equal to that of the cylindrical body portion, the bulb portion being compressed by the sides of the hole sufficiently to maintain its position as desired and to secure it against rotation while a threaded bolt having an expansion means thereon is inserted therein. As the bolt progresses through the bore of the plug, a lower plug element on the bolt initially expands the bulb section of the plug to assist in preventing rotation of the plug as the insertion of the bolt continues. Continued engagement of the expansion means in the bolt with the upper cylindrical portion of the plug expands the portions of the cylindrical section intermediate the longitudinal slots into a spreaded wing formation which bites into the walls of the concrete hole to make a secure connection therewith. Once the plug is expanded in this manner, the bolt can be withdrawn in a conventional fashion leaving the plug firmly imbedded within the hole.

It is a feature of the invention that the diameter of the anchor can be equal to that of the hole drilled in the floor, which in turn is equal in diameter to the fastening holes in the base of the machinery. In addition, since the anchor of the invention does not have to be bottomed in its associated hole, the depth of the hole which is drilled is not critical provided it is deep enough. Another advantage of the device of the invention is that the fastener can be removed at any time as desired without leaving any projection in the floor, so that the machinery can be readily removed when desired. In addition to embodiments designed primarily for use in floors, there are also variations adapted for use in suspending articles such as pipes, straps and hangers from concrete ceilings, which also have the desirable feature that the suspended devices can be readily removed and replaced without destroying the integrity of the attachment.

The invention will be better understood from the following detailed description thereof taken in conjunction with the accompanying drawings, in which like numerals are used to indicate like elements in the several views, and in which:

FIG. 1 is a side view of a typical anchor plug of the invention;

FIG. 2 is a top view of the embodiment of FIG. 1;

FIG. 3 is a bottom view of the embodiment of FIG. 1;

FIG. 4 is a sectional view along the line 4—4 of FIG. 2;

FIG. 5 is one embodiment of a suitable bolt used in conjunction with the plug of FIG. 1 for making an anchor bolt assembly;

FIG. 6 is a view during the installation of an assembly consisting of the bolt of FIG. 5 and the plug of FIG. 1 in a hole in concrete;

FIG. 7 is a view in partial section of a completed installation using the elements of FIGS. 1 and 5;

FIG. 8 is a side view of a different embodiment of anchor bolt useful with the plug of the invention;

Figure 9:
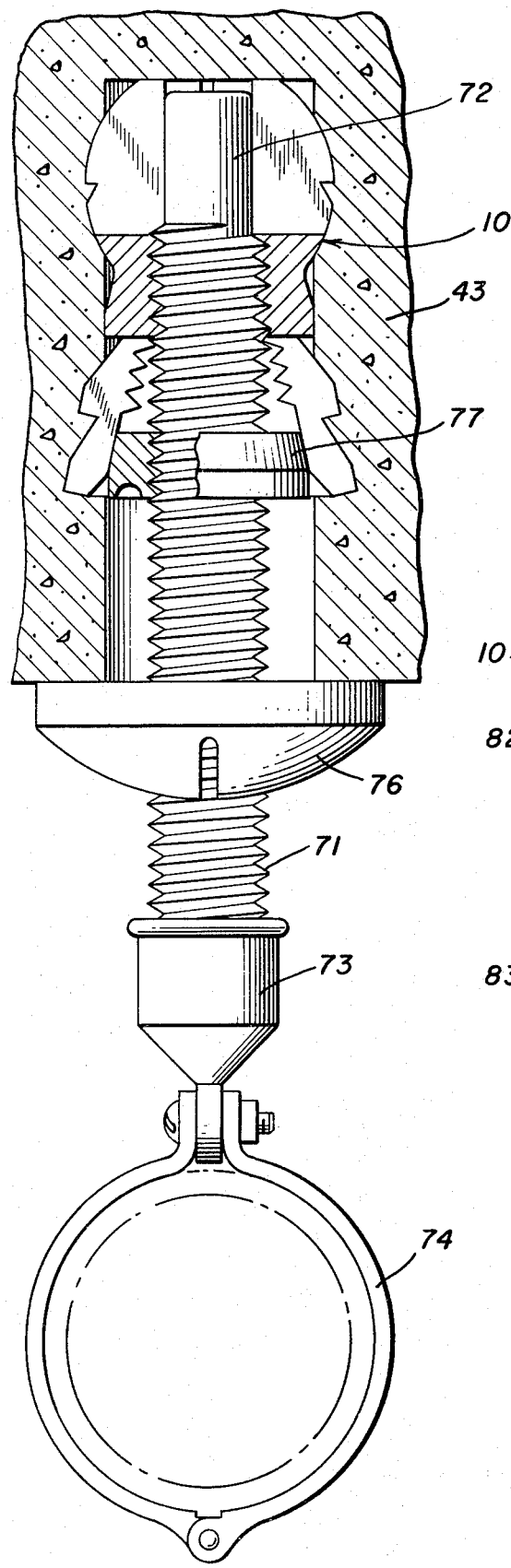
FIG. 9 is a view in partial section of an alternative embodiment of the invention installed in a concrete ceiling and used to support a suspension ring.

As shown in FIG. 1, the expansible anchor plug 10 of the invention comprises a tubular body having a cylindrical upper section 11 and a lower roughly spherical bulb section 12, said bulb section having a maximum diameter slightly larger than that of cylindrical section 11. Upper cylindrical section 11 is provided with a plurality (4 in the embodiment shown) of longitudinal slots 13 starting at the upper end of the plug and extending through most of the length of the cylindrical section. Similarly, bottom bulb section 12 of plug 10 is also provided with longitudinal slots 14 extending upwardly from the bottom thereof for most of the length of the bulb section. Slots 13 and 14 at the top and bottom of plug 10 terminate before meeting, leaving a section 16 intermediate the ends of the plug which is unslotted, as shown in FIG. 4. In order to increase the gripping power of plug 10 after it is installed, both cylindrical section 11 and bulb section 12 are provided with annular teeth 17 and 18 in their outer walls.

As shown in FIG. 4, the bore of plug 10 is not uniform. Unslotted zone 16 is provided with internal threads 19 which extend partially into cylindrical body section 11. The upper part of cylindrical body section 11 contains a threadless bore 21 having a diameter approximately equal to the major diameter of threaded section 16, while the lower unthreaded bore 22 in bulb section 12 has a diameter approximately equal to the minor diameter of threaded section 16.

One embodiment of a suitable bolt for use with the plug of FIG. 1 is shown in FIG. 5. As shown, bolt 31 has a conventional bolt head 32, a cylindrical body portion 33 having a diameter not larger than that of cylindrical body section 11 of plug 10 and preferably equal to the diameter thereof, a tapered section 34 extending from the body portion 33 to a threaded section 36 designed to engage the threads in unslotted section 16 of plug 10, and a lower unthreaded cylindrical plug section 37 having a diameter equal to the unthreaded lower bore 22 in plug 10.

The use of the bolt assembly of the invention is illustrated in FIGS. 6 and 7. As shown in FIG. 6, bolt 31 and plug 10 are assembled by screwing the threaded section 36 of the bolt into the threaded section 16 of the plug, until the threads on the bolt make partial engagement with the internal threads of the plug, the engagement being stopped short of the point where plug section 37 of the bolt enters the unthreaded lower bore 22 of the plug. With the parts assembled in this manner, the lower end of plug 10 is inserted into a predrilled hole 41 in a concrete floor 42 and the assembly is driven into position by striking the head 32 of bolt 31 with a hammer. As plug 10 enters hole 41 the sides of the hole compress the slotted bulb portion 12 as shown in FIG. 6 to permit the insertion of the plug into the hole. The deformation of bulb portion 12 at the same time permits a firm engagement of the plug 10 with the wall of hole 41. The plug is driven into the hole in this manner to a depth which is necessary or desirable for the particular application. Note that plug 10 need not bottomed in hole 41, since the coaction of bulb portion 12 with the wall secures the plug at any depth which is desired. With plug 10 inserted as far as necessary, bolt 31 is then rotated in a direction to increase the engagement of threaded portion 36 with threaded portion 16 of plug 10, It will be seen that as the bolt engages the plug, tapered section 34 of the bolt begins to expand the slotted upper cylindrical section 11 of the plug, while at the same time plug section 37 of bolt 31 also expands lower bulb section 12 thereof.

When bolt 31 is fully seated, as shown in FIG. 7, the head 32 thereof holds plate 51, which may be the base of a piece of machinery, firmly in position, while the sides of section 11 of the plug have been expanded into a spreadedwing arrangement in firm contact with the side walls of hole 41. In FIG. 7, the expansion of the cylindrical section 11 of plug 10 is somewhat exaggerated in order to illustrate the operation of the assembly. In practice, the expansion of the bolt would be in the order of a few thousandths of an inch, depending on the size of the bolt and the plug.

It will be seen that in a completed installation such as that shown in FIG. 7, the plug is permanently expanded into a fixed position, while the bolt can readily be removed by reversing its rotation, leaving the expanded plug within the hole. Accordingly, removal of the machinery attached thereby can readily be effected by removing the bolt as desired. Similarly, the bolt can be removed and replaced as often as it is necessary or desirable without affecting the integrity of the connection.

In the event that the thickness of the machinery base may vary from time, thus exceeding the take-up capacity of a headed bolt, an alternative version of the bolt is useful. As shown in FIG. 7, there is provided a headless threaded bolt 61 which has a square end 62 for rotation. A threaded nut 63 engages the bolt with as much take-up capacity as is necessary or desirable for accommodating plate 51.

In FIG. 9, there is depicted a plug 10 of the form shown in FIG. 1 which has been installed in a concrete ceiling 43, using for example a bolt of the type shown in FIG. 5 for setting the plug. In this installation, the bolt used for setting the plug has been removed and replaced with a section of threaded rod 71 having at its upper end a cylindrical plug 72 similar to that shown in bolt 31 (FIG. 5). Threaded rod 71 is provided at its lower end with a threaded cap 73 to which is attached any desired fixture, such as a split ring 74 for supporting pipes or tubes.

Since threaded rod 71 has a uniform diameter smaller than the hole in which the plug 10 is installed, there is provided a cap 76 which covers the hole in order to improve the appearance of the installation. An advantage of this type of construction, as shown in FIG. 9, is that the threaded rods can be removed and replaced as necessary with longer or shorter rods depending on the particular need at the time. In order to prevent any possible loosening of the plug 10 installed in the ceiling there can be used a threaded collar 77 engaging the threads of the rod 71 which enters the tapered bore opening of the plug 10 and prevents any possible collapse of the expanded plug.

Figure 10:
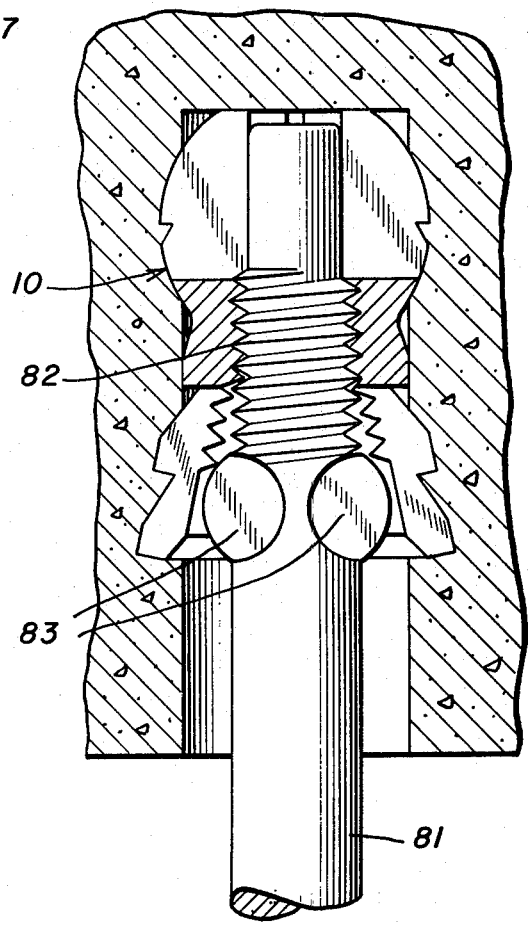
FIG. 10 is a modification of the ceiling installation shown in FIG. 9.

Another rod embodiment which can be used to prevent loosening of the expanded plug in a ceiling installation is shown in FIG. 10. In this embodiment, rod is threaded only at its end 82 and is provided with a pair of stamped dimples or wings 83 which enter the expanded portion of the plug, preventing collapse of the plug.

The foregoing detailed description has been given for clearness of understanding only, and no unnecessary limitations should be understood therefrom, as modifications will be obvious to those skilled in the art.

What is claimed is:

1. An expansible anchor plug adapted for use in a blind hole in a hard material, said plug comprising a tubular body having an upper cylindrical section and a lower generally spherical bulb section, said bulb section having a diameter larger than that of said cylindrical section, the outer surface of said bulb section having means adapted to grip the wall of said hole and impede rotation of said plug in said hole;

said cylindrical section being provided with a plurality of longitudinal slots extended downwardly from the top of said plug for permitting partial radial expansion of said cylindrical section;

said bulb portion being provided with a plurality of longitudinal slots extending upwardly from the bottom of said plug defining a plurality of radially resiliently deformable portions for permitting resilient compression of said bulb section to a diameter equal to that of said cylindrical section;

an intermediate section of said plug between said cylindrical section and said bulb section being unslotted;

the bore of said plug being provided with internal threads in said unslotted intermediate section.

2. The anchor plug of claim 1 in which said gripping means on said lower bulb section include external annular teeth.

3. The plug of claim 1 in which the bore of said plug is unthreaded adjacent the upper and lower bore openings, the upper unthreaded portion of said bore having a diameter equal to the major diameter of said threaded intermediate section, and the lower unthreaded portion of the bore having a diameter equal to the minor diameter of said threaded intermediate section.

4. An anchor bolt assembly adapted for use in a blind hole in a hard material, said assembly comprising in combination an expansible anchor plug comprising a tubular body having an upper cylindrical section and a lower generally spherical bulb section, said bulb section having a diameter larger than that of said cylindrical section, the outer surface of said bulb section having means adapted to grip the wall of said hole and impede rotation of said plug in said hole;

said cylindrical section being provided with a plurality of longitudinal slots extending downwardly from the top of said plug for permitting partial radial expansion of said cylindrical section;

said bulb portion being provided with a plurality of longitudinal slots extending upwardly from the bottom of said plug defining a plurality of radially resiliently deformable portions for permitting resilient compression of said bulb section to a diameter equal to that of said cylindrical section;

an intermediate section of said plug between said cylindrical section and said bulb section being unslotted;

the bore of said plug being provided with internal threads in said unslotted intermediate section; and a bolt comprising a cylindrical body section;

head means for rotating said bolt connected to one end of said body section;

an externally threaded section adapted to engage the internally threaded bore of said anchor plug;

an expansion section intermediate said body section and said threaded section having an effective diameter larger than the bore of the upper cylindrical section of said plug, whereby said cylindrical section is expanded by the entry thereinto of said expansion section;

and a cylindrical plug section adjacent said expansion section, said plug section having a diameter not larger than the bore of the bulb section of said anchor plug.

5. The assembly of claim 4 wherein the cylindrical body section of said bolt has a diameter equal to that of the upper cylindrical section of said anchor plug.

6. The assembly of claim 5 wherein said expansion section comprises a tapered section varying in diameter from the diameter of said cylindrical body section to the diameter of the bore of the upper cylindrical section of said anchor plug.

7. The assembly of claim 4 wherein the cylindrical body section of said bolt has a diameter smaller than that of the upper cylindrical section of said anchor plug.

8. The assembly of claim 7 wherein said expansion section comprises fluted dimples formed in the body section of said bolt.

9. The assembly of claim 7 in which said bolt has a uniform diameter threaded body which is provided with lock means comprising a threaded collar which enters the upper bore section of said anchor plug to prevent collapse thereof.

10. The assembly of claim 5 in which said gripping means on the lower bulb section of said anchor plug include external annular teeth.

11. The assembly of claim 5 in which the bore of said anchor plug is unthreaded adjacent the upper and lower openings, the upper unthreaded portion of said bore having a diameter equal to the major diameter of the threaded intermediate section of said anchor plug and the lower unthreaded portion of the bore having a diameter equal to the minor diameter of the threaded intermediate portion of the bore of said anchor plug.

* * * * *